(12) United States Patent
Baum et al.

(10) Patent No.: US 9,154,947 B2
(45) Date of Patent: Oct. 6, 2015

(54) SECURE HOME-TO-VEHICLE WIRELESS CONNECTIVITY

(75) Inventors: Alan M. Baum, Livonia, MI (US); Ansaf I. Alrabady, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2378 days.

(21) Appl. No.: 11/956,142

(22) Filed: Dec. 13, 2007

(65) Prior Publication Data

US 2009/0158396 A1 Jun. 18, 2009

(51) Int. Cl.
*H04L 9/32* (2006.01)
*H04W 12/06* (2009.01)
*B60R 25/20* (2013.01)
*H04W 84/22* (2009.01)
*H04L 29/08* (2006.01)

(52) U.S. Cl.
CPC ............ *H04W 12/06* (2013.01); *B60R 25/2018* (2013.01); *H04L 67/12* (2013.01); *H04W 84/22* (2013.01)

(58) Field of Classification Search
None
See application file for complete search history.

(56) References Cited

U.S. PATENT DOCUMENTS

| | | | |
|---|---|---|---|
| 6,738,914 B2 * | 5/2004 | Christopher | 713/323 |
| 6,839,710 B2 * | 1/2005 | Dabbish et al. | 701/35 |
| 7,131,005 B2 * | 10/2006 | Levenson et al. | 713/170 |
| 7,181,615 B2 * | 2/2007 | Fehr et al. | 713/156 |
| 7,202,775 B2 * | 4/2007 | Yezersky et al. | 340/426.1 |
| 7,228,420 B2 * | 6/2007 | Dabbish et al. | 713/170 |
| 7,251,330 B2 * | 7/2007 | Terao et al. | 380/255 |
| 7,366,892 B2 * | 4/2008 | Spaur et al. | 713/151 |
| 7,506,309 B2 * | 3/2009 | Schaefer | 717/120 |
| 7,548,744 B2 * | 6/2009 | Oesterling et al. | 455/411 |
| 7,761,232 B2 * | 7/2010 | Woodings | 701/213 |
| 2003/0159041 A1 * | 8/2003 | Yokota et al. | 713/168 |
| 2003/0189480 A1 * | 10/2003 | Hamid | 340/5.52 |
| 2003/0189481 A1 * | 10/2003 | Hamid | 340/5.53 |
| 2005/0086532 A1 * | 4/2005 | Lotspiech et al. | 713/201 |
| 2005/0131695 A1 | 6/2005 | Lucente et al. | |
| 2005/0216144 A1 | 9/2005 | Baldassa | |
| 2007/0219685 A1 | 9/2007 | Plante | |
| 2008/0043692 A1 * | 2/2008 | Morita | 370/338 |
| 2008/0148374 A1 * | 6/2008 | Spaur et al. | 726/6 |
| 2009/0073946 A1 * | 3/2009 | Morita | 370/338 |
| 2009/0300595 A1 * | 12/2009 | Moran et al. | 717/170 |
| 2010/0077094 A1 * | 3/2010 | Howarter et al. | 709/231 |
| 2010/0178872 A1 * | 7/2010 | Alrabady et al. | 455/41.3 |
| 2010/0312419 A1 * | 12/2010 | Woodings | 701/2 |

* cited by examiner

*Primary Examiner* — Christopher Revak
(74) *Attorney, Agent, or Firm* — John A. Miller; Miller IP Group, PLC

(57) ABSTRACT

A method for providing a secure communications link between a home PC and a vehicle through a wireless access point. The method includes providing a wireless connection between a vehicle communications system and the wireless access point and causing a user of the PC to initiate a communication with the vehicle communications system through the wireless access point so as to allow the user to send information to the vehicle from the home PC. The method also includes causing the vehicle communications system to send an authentication challenge to the PC, such as identifying a user name and password, to authorize the user to communicate with the vehicle communications system, and establishing a secure communications link between the vehicle communications system and the PC if the user responds to the challenge with a correct response.

20 Claims, 1 Drawing Sheet

SECURE HOME-TO-VEHICLE WIRELESS CONNECTIVITY

BACKGROUND OF THE INVENTION

1. Field of the Invention

This invention relates generally to a method for providing a secure wireless communications link between a personal computer (PC) and a vehicle and, more particularly, to a method for providing a secure wireless communications link between a home PC and a vehicle that includes causing the vehicle to verify that the user who is using the PC is an authorized user.

2. Discussion of the Related Art

It has been suggested in the art that future vehicles may include various systems that allow wireless communications to be received from a home PC so as to allow the owner of the vehicle, or an authorized user, to send information, data and commands to the vehicle from the PC. For example, it has been proposed that a vehicle owner will be able to download digital music wirelessly from the PC to the vehicle where it will be stored for future use. Further, it has been proposed to wirelessly transmit commands from the PC to the vehicle to provide various vehicle personalization and customization settings and parameters, such as using metric or English displays, selection of lighting features, orientation of seat position, etc., so that the vehicle owner can provide the customization from his/her home. Also, it has been proposed that pre-computed navigation directions can be sent to the vehicle from the home PC to be stored for a later trip.

In one proposed application, a user will have a wireless access point at his home that is hard-wired to the home PC. The user will also be able to access the internet from the PC, through the wireless access point or otherwise. The user will send signals and commands from the PC to the wireless access point that are broadcast or transmitted to the vehicle over a wireless link. The wireless transmission is encrypted at the access point and the vehicle so as to provide a secure link between the vehicle and the wireless access point. However, any malicious algorithms, spyware, applications, programs, etc. that reside on the PC, possibly from the internet, will be outside the secure link between the wireless access point and the vehicle, and thus may be able to access the vehicle from the PC through the wireless access point. Consequently, a potential problem exists where the security for transmitting messages between the home PC and the vehicle is not robust enough.

SUMMARY OF THE INVENTION

In accordance with the teachings of the present invention, a method for providing a secure communications link between a home PC and a vehicle through a wireless access point is disclosed. The method includes providing a wireless connection between a vehicle communications system and the wireless access point and causing a user of the PC to initiate a communication with the vehicle communications system through the wireless access point so as to allow the user to send information to the vehicle from the home PC. The method also includes causing the vehicle communications system to send an authentication challenge to the PC, such as identifying a user name and password, to authorize the user to communicate with the vehicle communications system, and establishing a secure communications link between the vehicle communications system and the PC if the user responds to the challenge with a correct response that has previously been entered directly into the vehicle system by the user.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for providing a secure communications link between a home PC and a vehicle is merely exemplary in nature, and is in no way intended to limit the invention or its applications or uses.

Figure 1:
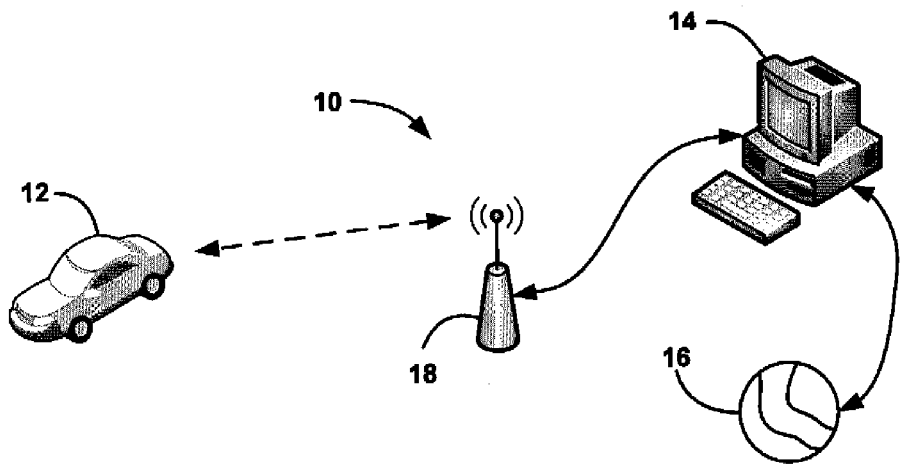
FIG. 1 is a plan view of a communications system showing a wireless link between a vehicle and a wireless access point and a hard-wired link between the wireless access point and a home PC.

FIG. 1 is a plan view of a communications system 10 providing a communications link between a vehicle 12 and a home or other PC 14, where the PC 14 has access to the internet 16. As used herein, PC refers to any computing system a person may be using in their home, work or other location that they may want to use to access their vehicle. Further, PC can represent other devices suitable for the purposes described herein, such as lap tops, iPhones, PDAs, Blackberries, etc. A wireless access point 18 that will typically reside in the home is used to transmit messages wirelessly from the PC 14 to the vehicle 12, and receive wireless transmissions from the vehicle 12 sent to the PC 14. The PC 14 is hard-wired to the wireless access point 18, and the internet 16 is hard-wired to the PC 14. Alternately, the connection between the PC 14 and the access point 18 could be wireless.

As discussed above, the wireless communications between the wireless access point 18 and the vehicle 12 are typically secure because the wireless transmissions are encrypted. However, programs and other applications running on the PC 14, possibly downloaded from the internet 16, are generally free to be transmitted between the PC 14 and the wireless access point 18, thus allowing those applications to gain access to the vehicle 12 through the wireless access point 18.

Figure 2:
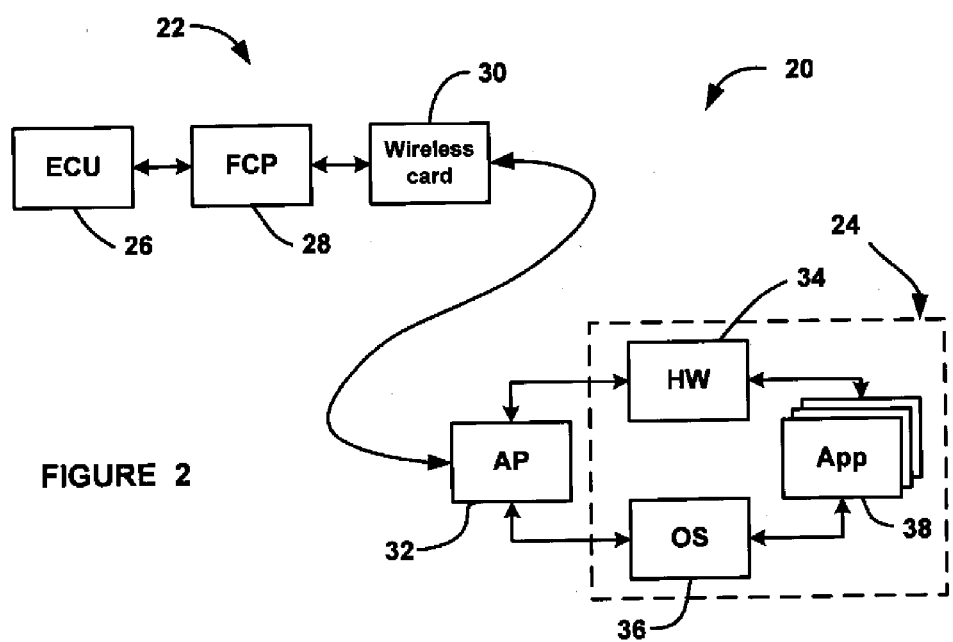
FIG. 2 is a block diagram of a communications system showing a secure communications link between a vehicle wireless connectivity processor and a home PC, according to an embodiment of the present invention.

According to the invention, a secure communications link is provided for the complete transmission path between the vehicle 12 and the PC 14. FIG. 2 is a block diagram of a communications system 20 providing wireless communications between a vehicle communications system 22 and a home PC 24, according to an embodiment of the present invention. The vehicle communications system 22 includes one or more electronic control units (ECUs) 26, a flexible computing platform (FCP) 28 and a wireless card 30. The wireless card 30 could be part of the FCP 28. The wireless card 30 receives and processes the wireless transmissions, which are then processed by the FCP 28 to a format usable by the ECUs 26 on the vehicle. The wireless card 30 also formats messages from the FCP 28 that are to be transmitted by the communications system 22. This configuration of hardware on a vehicle for this purpose is generally known in the art. The PC 24 includes hardware 34 and operating systems 36 running various software programs and applications 38. The PC 24 is hard-wired to the wireless access point (AP) 32, which is in communication with the communications system 20 over a wireless link, as discussed above.

The wireless link between the communications system 22 and the PC 24 through the access point 32 can be provided in any known or familiar manner where the system 22 and the PC 24 are aware of each other and are able to communicate wirelessly. In one non-limiting embodiment, the FCP 28 in the system 22 will have an internet address, where the user can open an internet browser on the PC 24, and type in the address of the FCP 28 so as to set up a communications link between the system 22 and the PC 24. A short-cut icon, labeled, for example, my vehicle, or other suitable operations can be used for this process.

Once the FCP 28 receives a message from the PC 24 that it wishes to communicate with the system 22, the FCP 28 will go through an authentication process where it will confirm that the PC 24 is an authorized user. For example, the FCP 28 can require the PC 24 to identify a shared secret between the two. Particularly, the FCP 28 can require the PC 24 to provide a valid user name and password through an internet browser window that has been configured by the FCP 28 and brought up by the user on the PC 24. Alternately, the FCP 28 can issue some other type of challenge to the PC 24 that the PC 24 needs to answer correctly. The shared secret will probably be stored in the system 22 directly by the user, and can be changed by the user. By going through such an authentication step, a secure link can be established between the FCP 28 and the PC 24 including the hard-wired connection between the access point 32 and the PC 24. This secure link allows the user to change various vehicle settings from a remote location. Thus, any malicious application or program running on the PC 24 that wants to gain access to the communications system 22 will need to know the authentication sequence, such as the user name and password in order to do so.

Through this process, it is the FCP 28 that validates the PC 24. The FCP 28 can provide configuration network pages through which the user can provide various commands to the vehicle 12 through the PC 24. The vehicle provides the configuration file from which the user can control various vehicle systems. Thus, it is the vehicle that controls what parameters the user can change and limits the commands the user can cause to be executed on the vehicle.

Once a secure communications link is established, the options for making changes to the vehicle are only as limited as the systems that are available on the vehicle. For example, the user can personalize or customize various vehicle settings, can download digital music to the vehicle, can download pre-computed navigation directions to the vehicle, etc.

Various protocols are known in the art for encrypting wireless transmissions that are applicable for the purposes described herein. In one non-limiting embodiment, the encrypting algorithm used to transmit messages wirelessly in this application can be the WPA2 protocol, well known to those skilled in the art. Known wireless access points typically can have their security system turned on or off by the user. If the security system of the wireless access point is off, then other users can use that wireless access point for wireless transmissions. In this situation, the present invention still causes the transmission between the vehicle communications system 22 and the PC 24 to be secure because it is the FCP 28 that is providing the control of the authentication process.

The present invention offers a number of advantages for securing a wireless communications between a PC and a vehicle. Particularly, the invention eliminates the risk for viruses that may reside on the home PC, provides a safer more constrained environment because the configuration utility is provided by and executed on the vehicle, allows the validation process to work whether or not the home PC user has correctly configured the home wireless access point to enable secure connections, and authenticates the user, not the PC. Further, the method of the invention provides a well-known interface, such as an internet browser, for the user to perform data transfers to the vehicle, and eliminates the need for distributing vehicle-specific software, such as CDs, that runs in the user's computer, which eliminates the cost of supporting different computers and operating systems.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for securing a communications link between a vehicle communications system and a computer through a wireless access point, said method comprising:
   providing a wireless connection between the vehicle communications system and the wireless access point;
   providing a connection between the computer and the wireless access point;
   causing a user of the computer to initiate a communication with the vehicle communications system through the wireless access point;
   causing the vehicle communications system to send a challenge to the computer to authenticate the user; and
   establishing a secure communications link between the vehicle communications system and the computer if the computer responds to the challenge with a correct response.

2. The method according to claim 1 wherein the computer communicates with the vehicle communications system through a web browser.

3. The method according to claim 1 wherein the computer is a home personal computer.

4. The method according to claim 1 wherein providing a connection between the computer and the wireless access point includes providing a hard-wired connection between the computer and the wireless access point.

5. The method according to claim 1 wherein the challenge includes identifying a proper user name and password.

6. The method according to claim 1 wherein the challenge is a shared secret.

7. The method according to claim 1 wherein the vehicle communications system provides configuration network pages to the computer to allow the user to make changes to the vehicle once the secure communications link has been established.

8. The method according to claim 1 wherein the user uses the secure communications link to personalize and customize various vehicle systems.

9. The method according to claim 1 wherein the user uses the secure communications link to download digital music to the vehicle.

10. The method according to claim 1 wherein the user uses the secure communications link to download pre-computed navigation directions to the vehicle.

11. A method for securing a communications link between a vehicle communications system and a computer through a wireless access point, said method comprising:

providing a wireless connection between the vehicle communications system and the wireless access point;
providing a connection between the computer and the wireless access point;
causing a user of the computer to initiate a communication with the vehicle communications system through the wireless access point using a web browser;
causing the vehicle communications system to send an authentication network page to the computer asking the user for a user name and password;
establishing a secure communications link between the vehicle communications system and the computer if the computer provides a correct user name and password; and
providing configuration network pages to the computer to allow the user to make changes to the vehicle once the secure communications link has been established.

12. The method according to claim 11 wherein the computer is a home personal computer.

13. The method according to claim 11 wherein providing a connection between the computer and the wireless access point includes providing a hard-wired connection between the computer and the wireless access point.

14. The method according to claim 11 wherein the user uses the secure communications link to personalize and customize various vehicle systems.

15. The method according to claim 11 wherein the user uses the secure communications link to download digital music to the vehicle.

16. The method according to claim 11 wherein the user uses the secure communications link to download pre-computed navigation directions to the vehicle.

17. A method for securing a communications link between a vehicle communications system and a computer through a wireless access point, said method comprising:
providing a wireless connection between the vehicle communications system and the wireless access point;
providing a connection between the computer and the wireless access point; and
causing the vehicle communications system to verify that a user of the computer is authenticated to communicate with the vehicle before allowing the user to change vehicle settings wirelessly from the computer.

18. The method according to claim 17 wherein the computer is a home personal computer.

19. The method according to claim 17 wherein providing a connection between the computer and the wireless access point includes providing a hard-wired connection between the computer and the wireless access point.

20. The method according to claim 17 wherein the vehicle communications system verifies that a user of the computer is authorized to communicate with the vehicle by asking the user for a user name and password.

* * * * *